3,342,806
NOVEL ACETOACETYLATED STARCH
DERIVATIVES
Dilip Kumar Ray-Chaudhuri, Westfield, N.J., assignor to National Starch and Chemical Corporation, New York, N.Y., a corporation of Delaware
No Drawing. Filed July 23, 1965, Ser. No. 474,447
5 Claims. (Cl. 260—233.5)

ABSTRACT OF THE DISCLOSURE

Acetoacetate esters of starch are prepared by reacting starch with diketene at controlled temperatures and pH levels, in aqueous or organic media, and in the presence of selected catalysts. The resulting acetoacetate esters may be used in food, cosmetic, adhesive and paper and textile sizing applications, etc.

---

This invention relates to a method for the preparation of acetoacetate esters of starch and, more particularly, to the novel derivatives thereby obtained.

It is the prime object of this invention to prepare acetoacetate esters of starch by means of an efficient and economical reaction procedure. Various other objects and advantages of this invention will become apparent from the following description.

Thus, I have now found that novel acetoacetate esters of starch may be prepared by reacting starch with diketene at controlled temperatures and pH levels, in either aqueous or non-aqueous media, and in the presence of selected catalysts. These unique starch derivatives are, thus, being produced according to the following reaction mechanism:

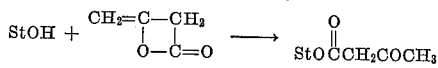

wherein StOH represents the starch molecule. It has been further found that the resulting acetoacetate starch esters contain active methylene groups which can be readily crosslinked, as required, in various applications wherein these derivatives may be utilized.

The applicable starch base materials which may be used in preparing these novel starch derivatives may be either in a dispersed, i.e. gelatinized, or an intact granule form. They may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. In addition, the amylose and amylopectin fractions derived from any of the above noted starch bases may also be utilized. It is also possible to employ, in this process, any substituted ester or ether derivatives of these starch bases or their amylose or amylopectin fractions, provided that such ester or ether derivatives still retain hydroxyl groups which are available for further reaction in the above described reaction mechanism. The use of the term "starch base" is thus seen to include any amylaceous substances, whether untreated or chemically modified, which still retain free hydroxyl groups capable of entering into the novel reaction of this invention.

In general, when a aqueous medium is utilized in conducting the reaction, the novel process of this invention comprises the steps of first thoroughly dispersing the selected starch base in water and then adding diketene, at a controlled rate, to the resulting starch dispersion.

The reaction may take place in the presence of either alkaline or acidic catalysts, although the use of an alkaline catalyst is greatly preferred inasmuch as the use of acidic catalysts such as sulfuric acid, phosphoric acid, hydrochloric acid, and benzene sulfonic acid, etc., results in an extreme drop of reaction efficiency. Applicable alkaline catalysts include alkali metal hydroxides, alkaline-earth hydroxides, quaternary ammonium bases, alkali metal phosphates, and salts of weak acids, etc. The reaction is ordinarily carried out at temperatures ranging from about 5 to 95° C. and preferably from about 5 to 35° C. The pH level of the system is maintained throughout the course of the reaction in the range of from about 4 to 11 and preferably from about 7 to 9. The pH of the system is maintained at the latter level by the addition, to the system, of sufficient portions of an aqueous solution containing about 3%, by weight, of any of the above mentioned alkaline catalysts.

Upon the completion of the addition of the diketene, the reaction system is maintained, under agitation, at the preferred pH level and temperature. The slurry is then adjusted to a pH level of from about 3 to 7, and preferably to a pH of 5, by the addition of a dilute aqueous solution of an acid such as hydrochloric acid. The resulting reaction product is then filtered, washed and finally air-dried.

Where a non-aqueous medium is utilized, the reaction between the diketene and the previously dispersed starch base may, again be conducted in the presence of either alkaline or acidic catalyst. Thus, applicable base catalysts include such tertiary amines as pyridine, picoline, and morpholine, etc. These basic catalysts may serve a double function by also acting as solvents for the system. Other tertiary amine base catalysts, such as triethylamine, may be used in conjunction with solvents such as dimethylformamide and dimethylsulfoxide. Acid catalysts which are applicable to the process of this invention, as conducted in a non-aqueous system, include sulfuric acid, phosphoric acid, perchloric acid, benzene sulfonic acid, methane sulfonic acid, and para-toluene sulfonic acid. The latter catalysts are usually utilized in conjunction with an acetic acid solvent. The choice as to which type of catalyst is to be utilized is left to the discretion of the practitioner although such undesirable side effects as the possibility of obtaining colored products when certain base catalysts are used and the potential for greater starch degradation when mineral acid catalysts are used must be carefully considered in deciding this question.

In any event, in these non-aqueous media, the diketene is added to the solvent dispersion of the starch base at a controlled rate. The reaction is ordinarily carried out at temperatures ranging from about 50 to 100° C.; the entire span of the latter range of temperatures being applicable to the use of acid catalyzed systems while the upper end of the latter range, i.e. 80 to 100° C., is preferred for the use of the base catalyzed systems. Although temperatures which are either higher or lower than the latter specified temperature range may be also utilized, the undesirable polymerization of diketene which is very pronounced at higher temperatures and the slow rate of acetoacetylation which is encountered at lower temperatures make such deviations from the specified temperature range undesirable. Upon the completion of the addition of the diketene, the reaction system is maintained, under agitation, at the selected temperature. The resulting reaction product is isolated by being filtered, washed, and dried at room temperature and then, under vacuum, at a temperature of from about 50 to 100° C. for a period of about 6 to 24 hours.

With respect to proportions, in both the aqueous and non-aqueous systems the solvent should be present in a concentration of from about 1 to 20 parts, by weight, per part, by weight, of starch base. Where catalysts are present, in addition to and distinct from the solvent, a maximum of about 5% catalyst, by weight of starch base, is sufficient to promote the reaction. The concentration of diketene used is dependent on the degree of substitution of acetoacetyl groups in the final derivative which is desired by the practitioner. Thus, concentrations ranging as high as about 300%, as based on the weight of starch base, may be utilized.

In either aqueous or non-aqueous reaction media, the rate of addition of diketene as well as the time allocated for the complete reaction are dependent on the pH level and the temperature of the reaction mixture. Thus, in selecting applicable diketene addition rates and overall reaction periods, the practitioner must weigh such conflicting factors as: (1) the desirability for adding the diketene at a slow rate in order to prevent the build up of a high concentration of diketene which may lead to exothermic diketene polymerization; and (2) the need for a shorter reaction period in order to prevent any pronounced degradation of the starch base. As a general rule, however, increased reaction rates are favored at higher pH levels and temperatures while reduced diketene addition rates and longer overall reaction periods are favored at lower pH levels and temperatures.

Mixed esters of starch, i.e. starch derivatives containing acetoacetate groups as well as at least one other ester group, may also be prepared by the novel process of this invention. Thus, mixed esters may be readily and efficiently prepared by treating a starch base with a mixture of diketene and a selected acid anhydride, such as acetic anhydride, propionic anhydride and butyric anhydride, etc. On the other hand, such mixed esters may be prepared by reacting diketene with a starch acylate such as a starch acetate ester. The relative concentions of the acylating mixtures may be varied in order to provide any desired degree of substitution of the different acyl groups.

As previously noted, excellent reaction efficiency is achieved in the novel process of this invention. Thus, for purposes of this invention, "percent efficiency" is meant to denote the ratio between the percent, by weight, of acetoacetyl groups which are present in the resulting starch derivative and the percent of diketene, as based on the weight of the initial starch base, utilized in its preparation, multiplied by 100. In most instances, the percent efficiency exceeds about 50%. The acetoacetate starch derivatives of this invention may contain from about 0.01 to 61.5% of acetoacetyl groups, as based on the total weight of the resulting derivative. The latter range is equivalent to a degree of substitution, i.e. number of acetoacetyl groups per anhydroglucose unit of the starch molecule, ranging from about 0.0004 to 3.0.

The products of this invention, because of their unique combination of properties, can be utilized in many applications. Thus, acetoacetate esters of starch containing less than about 15%, by weight, of acetoacetyl groups are found to exhibit excellent stability, i.e. they do not retrograde or gel after storage at room temperature for several months. On cooking in boiling water, these starch esters yield pastes which are smoother, clearer, and more viscous than those derived from raw starch. These derivatives are, thus, ideally suited for use in food applications; textile, paper and glass fiber sizing; adhesive and structural products; surgical dusting powders; and cosmetic purposes, as well as in other applications wherein it may be desirable to effect the crosslinking of these novel derivatives. It is to be noted that acetoacetate esters of starch containing in excess of about 15%, by weight, of acetoacetyl groups are no longer dispersible in hydroxylated solvents such as water, alcohols, and ketones. On the other hand, acetoacetate esters of starch containing more than about 55%, by weight, of acetoacetyl groups may be rendered thermoplastic by the addition of suitable plasticizers, such, for axemple, as dibutyl phthalate and dioctyl phthalate, etc. and may thus be used as plastics.

The following examples will further illustrate the embodiment of this invention. In these examples, all parts given are by weight unless otherwise noted.

EXAMPLE I

This example illustrates the preparation of a typical acetoactate ester of starch by means of the novel process of this invention. In this instance, the reaction was conducted in an aqueous medium.

The following ingredients were introduced into a reaction vessel equipped with means for monitoring the pH level of the system and for effecting the mechanical agitation thereof.

|  | Parts |
|---|---|
| Corn starch | 150.0 |
| Water | 225.0 |
| Diketene | 7.5 |

The corn starch was first thoroughly dispersed in the water whereupon the diketene was then added, under continued agitation, over a period of 10 minutes. The pH of the system was maintained at a level of 8.5 by the addition, when required, of portions of a 3%, by weight, aqueous sodium hydroxide solution. The entire reaction was thereupon allowed to proceed at a temperature of 25° C. over a period of 25 minutes. At the conclusion of the reaction, the pH of the system was adjusted to a level of 5 by the addition of a portion of 3%, by weight, aqueous hydrochloric acid solution. The resulting product was then filtered, washed several times with water in order to remove residual sodium salts formed during the reaction, and then air dried.

The acetoacetyl content of the resulting starch acetoacetate ester was determined by cooking 5 parts of the product with 200–225 ml. of water at a temperature of 100° C. for a period of 20 minutes. The cooked starch derivative was then cooled to room temperature whereupon 50 ml. of a 0.1 N sodium hydroxide solution were added thereto. The ensuing reaction was allowed to continue, under agitation, for a period of one hour whereupon the excess alkali was back titrated with 0.1 N hydrochloric acid using phenolphthalein as an indicator for the system. The latter procedure thus indicated that the starch acetoacetate ester, as prepared by the above procedure, contained 3.68% of acetoacetyl groups, as based on the total weight of the derivative, thus corresponding to a reaction efficiency of 73.6%.

EXAMPLE II

This example further illustrates the acetoacetylation of a variety of starch bases by means of the novel process of this invention.

The procedures utilized to prepare and analyze the products of this example were identical to the procedures described in Example I, hereinabove. The following table sets forth the starch derivatives thus prepared.

| Starch Base | Percent diketene, as based on wt. of starch base | Percent, by wt., of acetoacetyl groups in resulting derivative | Percent reaction efficiency |
|---|---|---|---|
| Waxy maize | 5 | 3.60 | 72.0 |
| Tapioca | 5 | 4.04 | 80.8 |
| Wheat | 5 | 3.97 | 79.4 |
| Potato | 5 | 4.00 | 80.0 |
| Corn starch (acid converted with HCl to a degree known, in the trade, as 80 fluidity) | 5 | 3.40 | 68.0 |
| High amylose corn starch (containing 70%, by wt., amylose) | 10 | 6.21 | 62.1 |

The data summarized, hereinabove, clearly indicates the overall reaction efficiency and applicability to various starch bases on the part of the novel process of this invention.

EXAMPLE III

This example illustrates the adverse effects upon the reaction efficiency of the novel process of this invention when the conditions utilized therein do not fall within the preferred limits.

(a) Effects of variations in diketene concentration

A number of different acetoacetate esters of corn starch, as described in the following table, were prepared and analyzed according to the procedures set forth in Example I, hereinabove; the only variations from the latter procedures being the varied concentrations of diketene which were utilized in the preparation of the respective derivatives.

| Percent diketene, as based on the weight of starch base | Percent, by wt., of acetoacetyl groups in resulting derivative | Percent reaction efficiency |
|---|---|---|
| 5 | 3.68 | 73.6 |
| 10 | 6.26 | 62.6 |
| 20 | 8.05 | 40.2 |
| 207 | 35.80 | 17.3 |

The data summarized, hereinabove, clearly indicate the potential for preparing starch acetoacetate esters containing varied amounts of acetoacetyl groups. It also indicates, however, the corresponding decrease in reaction efficiency which results as the concentration of diketene utilized in the reaction increases.

(b) Effect of variations in pH of the system

A number of different acetoacetate esters of corn starch, as described in the following table, were prepared and analyzed according to the procedures set forth in Example I, hereinabove; the only variation from the latter procedures being the fact that the pH of the respective reaction systems were varied by adding larger or smaller portions of the 3%, by weight, aqueous sodium hydroxide solution.

| pH | Percent, by wt., of acetoacetyl groups in resulting derivatives | Percent reaction efficiency |
|---|---|---|
| 5 | 1.17 | 27.4 |
| 6 | 1.94 | 38.8 |
| 7 | 3.02 | 60.4 |
| 8 | 3.61 | 72.2 |
| 8.5 | 3.68 | 73.6 |
| 9 | 3.59 | 71.8 |
| 10 | 2.48 | 49.6 |

The data summarized, hereinabove, clearly indicate the advisability of conducting the acetoacetylation reaction of this invention within the preferred pH range of from about 7 to 9 where aqueous media are utilized therein.

(c) Effect of variations in temperature

A number of different acetoacetate esters of corn starch, as described in the following table, were prepared and analyzed according to the procedures set forth in Example I, hereinabove; the only variation from the latter procedures being the fact that the reactions were conducted at varying temperatures.

| Temperature (° C.) | Percent, by wt., of acetoacetyl groups in resulting derivatives | Percent reaction efficiency |
|---|---|---|
| 15 | 3.85 | 77.0 |
| 25 | 3.68 | 73.6 |
| 35 | 3.33 | 66.6 |
| 50 | 1.55 | 31.0 |

The data summarized, hereinabove, clearly indicate the desirability of conducting the acetoacetylation reaction of this invention at temperatures not exceeding about 35° C. when aqueous media are utilized therein.

(d) Effect of extended reaction time

A number of different acetoacetate esters of corn starch, as described in the following table, were prepared and analyzed according to the procedures set forth in Example I, hereinabove; the only variations from the latter procedures being the increase of the reaction temperature to 50° C. and the variations in the length of the overall reaction periods utilized.

| Reaction Time (min.) (after diketene addition) | Percent, by wt., of acetoacetyl groups in resulting derivatives | Percent reaction efficiency |
|---|---|---|
| 12 | 3.39 | 67.8 |
| 24 | 1.56 | 31.0 |

The data summarized, hereinabove, clearly indicate the resulting decline in reaction efficiency when the reaction is allowed to proceed at elevated temperatures for increased periods of time.

EXAMPLE IV

This example illustrates the use of a gelatinized starch base in the novel acetoacetylation process of this invention.

A vessel containing 20 parts of corn starch and 230 parts of water was heated for 30 minutes in a boiling water bath. The resulting product was then subjected to high speed agitation and thereupon cooled to 25° C. A total of 10 parts of diketene was then added to the starch dispersion over a period of 15 minutes. An additional 100 parts of water were added to the resulting dispersion in order to reduce its viscosity to a more manageable level. The pH of the system was brought to a level of 8.5 by the addition of sufficient portions of a 3%, by weight, aqueous sodium hydroxide solution. The reaction was then allowed to proceed for a period of 35 minutes at a temperature of 25° C., whereupon the pH of the system was adjusted to a level of 5 by the addition of portions of a 3%, by weight, aqueous hydrochloric acid solution. The resulting acetoacetylated product was isolated by dialyzing the mixture, concentrating it, and then freeze-drying it. The resulting product contained 17.75%, by weight, of acetoacetyl groups; the latter concentration corresponding to a reaction efficiency of 35.5%.

EXAMPLE V

This example illustrates the use of an organic solvent medium in the novel acetoacetylation process of this invention.

(a) Acid catalyzed system

The amylose base utilized in this procedure was derived from the fractionation of potato starch and was activated by treatment with distilled water followed by gradual replacement of the water with glacial acetic acid. The latter activation procedure thereby permitting the amylose to react with the diketene at a substantially faster rate.

Following this activation procedure, 10 parts of the resulting activated amylose, 75 parts of glacial acetic acid, and 0.5 part of phosphoric acid were introduced into a reaction vessel equipped with a reflux condenser and means for mechanical agitation. The vessel was then heated to a temperature of 55 to 60° C., whereupon 20.7 parts of diketene was added to the system over a period of 30 minutes. When the addition of diketene was completed, the temperature of the system was raised to 95° C. and the reaction allowed to proceed at the latter temperature for 3 hours. The resulting reaction product was precipitated in methanol, completely pulverized, washed in alcohol, air dried, and then dried, under vacuum, at a temperature of 50° C. for 24 hours.

The resulting acetoacetate ester of amylose was analyzed by suspending one part of the ester in 100 parts of a 0.225 N alcoholic potassium hydroxide solution. The dispersion was heated for 24 hours, under a nitrogen atmosphere, at a temperature of 50 to 60° C. The dispersion was then cooled to room temperature and titrated against hydrochloric acid. It should be noted that this analytical procedure is utilized for analyzing starch acetoacetate esters containing a high degree of substitution; the original procedure, as described in Example I, not being applicable to starch derivatives which are not dispersible in water.

The amylose acetoacetate ester, described hereinabove, was thus found to contain 61.3%, by weight, of acetoacetyl groups.

(b) *Base catalyzed system*

The general procedure used in this preparation was similar to the procedure set forth in the acetic acid preparation described hereinabove. The only variation from the latter procedure was that pyridine was utilized both as solvent and catalyst for the system while the reaction was run for an overall time of 3½ hours at a temperature of 100° C. The reagents present in the initial reaction mixture are set forth in the following table:

| | Parts |
|---|---|
| Activated amylose | 10.2 |
| Pyridine | 100.0 |
| Diketene | 21.2 |

The product was isolated and analyzed in a manner similar to that described, hereinabove, for the acid catalyzed product. The resulting amylose acetoacetate was light-orange in color and contained 47.4%, by weight, of acetoacetyl groups.

The results presented, hereinabove, clearly indicate that the novel process of this invention is equally effective when utilized with non-aqueous solvent media.

EXAMPLE VI

This example illustrates the preparation of mixed starch esters by means of the novel process of this invention.

The procedure set forth in Example I, hereinabove, was utilized to prepare the starch acylate-acetoacetates of this example; the only variation from the latter procedure being the substitution of a mixture of 7.5 parts of diketene and 4.5 parts of acetic anhydride for the unmixed diketene of the latter procedure. The resulting corn starch acetate-acetoacetate derivative contained 1.04%, by weight, of acetyl groups and 3.05%, by weight, of acetoacetyl groups. The latter acetoacetyl value correspond to a reaction efficiency of 61.0%.

An acetate ester of corn starch was also prepared under the above described reaction conditions with the exception, of course, that diketene was not present in the system. The resulting product again contained 1.04%, by weight, of acetyl groups. The latter result indicates that the presence of the diketene in the system, and the resulting acetoacetylation reaction, does not detract from the efficiency of the conventional acylation reaction.

The above described procedures, i.e. (1) the mixed acylation-acetoacetylation; and (2) the conventional acylation, were then repated under identical conditions with the exception that propionic anhydride and butyric anhydride were each, in turn, respectively substituted for the acetic anhydride. The results obtained are set forth in the following table:

| Ester Product | Percent, by wt., acyl groups in resulting derivative | Percent, by wt., acetoacetyl groups in resulting derivative | Percent, reaction efficiency (acetoacetylation) |
|---|---|---|---|
| Corn starch propionate | 0.91 | | |
| Corn starch propionate-acetoacetate | 0.91 | 3.59 | 71.8 |
| Corn starch butyrate | 0.99 | | |
| Corn starch butyrate-acetoacetate | 0.99 | 3.77 | 75.4 |

It should be noted that mixed esters may also be prepared by reacting a previously prepared starch acylate with diketene. Thus, an acetate ester of corn starch containing 1.02%, by weight, of acetyl groups was reacted with diketene according to the procedure set forth in Example I, hereinabove. The resulting acetoacetate ester of corn starch acetate contained 3.75%, by weight, of acetoacetyl groups which corresponded to a reaction efficiency of 75.0%.

It is, thus, observed that the mixed esterification of starch may be efficiently accomplished by utilizing the novel process of this invention.

Summarizing, it is thus seen that this invention provides an efficient procedure for the preparation of novel acetoacetate esters of starch.

Variations may, of course, be made in procedures, proportions, and materials without departing from the scope of this invention which is limited only by the following claims.

What is claimed is:

1. A process for the preparation of acetoacetyl esters of starch corresponding to the formula:

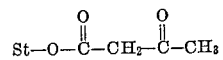

wherein St represents the starch molecule; said process comprising reacting a starch base with diketene in a solvent medium selected from the group consisting of aqueous and organic solvent media; and recovering said acetoacetyl ester; wherein with an aqueous medium for said process said reaction is conducted in the presence of a catalyst selected from the group consisting of acidic and basic catalysts, at a temperature of from about 5° to 95° C., and at a pH level of from about 4 to 11 and reduced to pH 3–7 before recovery; and wherein with an organic solvent medium for said process said reaction is conducted in the presence of a catalyst selected from the group consisting of acidic and basic catalysts and at a temperature of from about 50° to 100° C.

2. The process of claim 1, wherein said reaction is conducted in an organic solvent medium which also serves as a basic catalyst for the system.

3. The process of claim 1, wherein said acetoacetate ester of starch contains from about 0.01 to 61.5% of acetoacetyl groups, as based on the total weight of said acetoacetyl ester.

4. An acetoacetate ester of starch corresponding to the formula:

wherein St represents the starch molecule; said acetoacetate ester containing from about 0.01 to 61.5% of acetoacetyl groups, based on the total weight thereof.

5. The acetoacetate ester of starch of claim 4, wherein said acetoacetate ester contains at least one other acyl group.

References Cited

UNITED STATES PATENTS

| 2,326,006 | 8/1943 | Bruson | 260—84 |
| 3,130,118 | 4/1964 | Chapman | 260—233.3 |
| 3,153,019 | 10/1964 | Spes et al. | 260—78.3 |
| 3,236,913 | 2/1966 | Pfeiffer | 260—856 |

DONALD E. CZAJA, *Primary Examiner.*

R. W. MULCAHY, *Assistant Examiner.*